United States Patent [19]

Dixon et al.

[11] Patent Number: 4,876,030

[45] Date of Patent: Oct. 24, 1989

[54] ORGANOPHILIC CLAY SUSPENSION MEDIUM

[75] Inventors: George G. Dixon; Robert M. Parlman, both of Bartlesville, Okla.; Wayne Stewart, Coffeyville, Kans.

[73] Assignee: Phillips Petroleum Company, Bartlesville, Okla.

[21] Appl. No.: 119,608

[22] Filed: Nov. 12, 1987

[51] Int. Cl.$^4$ .................. B01J 13/00; C09K 7/06; C10M 113/16

[52] U.S. Cl. .................. 252/315.2; 106/287.17; 252/28; 252/8.515

[58] Field of Search .................. 252/8.515, 315.2, 28; 106/287.17

[56] References Cited

U.S. PATENT DOCUMENTS

| | | | |
|---|---|---|---|
| 2,661,301 | 12/1953 | Capell | 252/315.2 X |
| 4,391,637 | 7/1983 | Mardis et al. | 106/20 |
| 4,425,244 | 1/1984 | House | 252/315.2 X |
| 4,435,218 | 3/1984 | Jubanowsky | 106/272 X |
| 4,450,095 | 5/1984 | Finlayson | 252/315.2 |
| 4,464,274 | 8/1984 | House | 252/28 |
| 4,528,104 | 7/1985 | House et al. | 252/8.515 |
| 4,558,075 | 12/1985 | Suss et al. | 523/216 |
| 4,566,977 | 1/1986 | Hatfield | 252/8.5 |
| 4,664,820 | 5/1987 | Magauran et al. | 252/315.2 X |

OTHER PUBLICATIONS

The Glycol Ethers Handbook (Dow ®).

*Primary Examiner*—Herbert B. Guynn
*Attorney, Agent, or Firm*—Hal Brent Woodrow

[57] ABSTRACT

A novel organophilic clay suspension medium prepared by admixing an organophilic clay with a hydrocarbon oil and an activator selected from the group consisting of phenyl hydroxyalkyl ethers and phenylalkanols. Optionally water may be added to the admixture for further improving the suspension medium.

12 Claims, No Drawings

ORGANOPHILIC CLAY SUSPENSION MEDIUM

The present invention relates to improved organophilic clay suspension medium and the use of same.

BACKGROUND OF THE INVENTION

The use of organophilic clays in the preparation of mediums to facilitate the suspension of particulate matter in liquid hydrocarbons is a common practice in production of paints, drilling fluids and greases. In the use of these organophilic clays there is required the addition of chemical activators with high shear mixing to form a suspension medium with the organophilic clays. These suspension mediums also tend to have relatively short shelf-lives which significantly reduce their value and utility. Thus it would be a highly desirable contribution to the art to provide an improved organophilic clay suspension which has a longer shelf life, which does not require high shear mixing and which also extends the organophilic clays suspending capacity.

Accordingly it is the object of this invention to provide a more stable organophilic suspension medium. Another object of this invention is to provide organophilic suspension mediums which have improved suspending characteristics. Yet another object of this invention is to provide an organophilic suspension medium which does not require high shear mixing to be formed.

A further object of this invention is to provide a suspension medium useful in drilling fluids.

Other aspects, objects and several advantages of this invention will be apparent from the foregoing specification and claims.

In accordance with one embodiment of the present invention I have discovered an improved organophilic clay suspension medium comprising an organophilic clay, a liquid hydrocarbon and an activator is obtained when the activator is at least one activator selected from the group of phenyl hydroxyalkyl ethers and phenyl alkanols.

In another embodiment of the present invention I have further discovered that the addition of water as a co-activator further enhances the suspending characteristic of the resulting organophilic clay suspension medium.

In yet another embodiment of this invention I have discovered that the organophilic clay suspension medium formed using this invention when admixed with solid particulate materials forms a stable suspension.

As used in this application, the term organophilic clay is intended to include those clays in which the inorganic cations associated with the clay have been displaced by organic cations such as a quaternary ammonium cation.

The organophilic clays used in this invention comprise the reaction product of a natural clay selected from the group consisting of anionic bentonite, attapulgite, sepiolite and hectorite admixed with organic cations and synthetic organophilic clays and admixtures thereof. The natural clays can be represented by the formula $[R_2N(CH_3)_2]^+ clay^-$, wherein R is an alkyl group containing between 8 to 16 carbon atoms.

Another suitable quaternary cation is of the formula

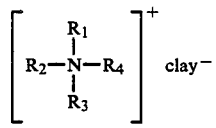

where $R_1$ is $CH_3$ or $C_6H_5CH_2$; $R_2 R_3$ and $R_4$ are alkyl group containing 14 to 20 carbon atoms and mixtures thereof.

Yet another example of a suitable quaternary cation consists of at least one lineal or branched alkyl group having 12 to 22 carbon atoms. The remaining moieties on the central positively charged atoms are chosen from (a) lineal or branched alkyl groups having 1 to 22 carbon atoms; (b) aralkyl groups, that is benzyl and substituted benzyl moieties including fused ring moieties having lineal or branched alkyl groups having 1 to 22 carbon atoms in the alkyl portion of the structure; (c) aryl groups such as phenyl and substituted phenyl including fused ring aromatic substituents.

The organophilic clays of this invention are generally used in an amount in the range of from about 0.5 to about 8 weight percent. Preferably the organophilic clays should be present in an amount in the range of from about 1 to about 5 weight percent.

The organophilic clays of this invention are mixed with the liquid hydrocarbons or the liquid hydrocarbon are mixed with either the phenyl hydroxyalkyl or phenylalkanol activators or admixes thereof. However, if the liquid hydrocarbon is mixed with the activator before the addition of the organophilic clay, the clay should be added slowly with sufficient agitation to avoid the formation of fish eyes. Preferably the organophilic clays are mixed with the hydrocarbon carrier prior to the addition of either the phenyl hydroxyalkyl or phenylalkanol activators or admixtures thereof.

Suitable liquid hydrocarbons are those hydrocarbons which are liquid at room temperature and standard atmospheric pressure. Suitable liquid hydrocarbons are those selected from the group consisting of crude oil, kerosene, naphthas, heavy naphthas, straight run gasoline, diesel fuel, jet fuel, benzene, xylene, toluene and isoparaffinic oil. In a presently preferred emobidment of this invention isoparaffinic oil having a flash point within the range of 100° to 220° F. and comprised of $C_7$ to $C_{17}$ are used for the practice of this invention. Most preferred is an isoparaffinic oil with $C_7$ to $C_{14}$ hydrocarbon chains because of its low pour point and relatively high flash point.

The liquid hydrocarbon and clay are mixed by any suitable means which produces sufficient agitation to homogenize the mixture. Suitable mixing devices are available and known in the art. Mixing should be continued until a homogeneous mixture of clay and liquid hydrogen is obtained.

The amount of liquid hydrocarbon is generally in an organophilic clay suspension medium should be present in the range of from about 99 to about 70 weight percent hydrocarbon. Preferably the liquid hydrocarbon should be present in the quantity from about 70 to about 90 weight percent.

Activators suitable for the practice of this inveniton are phenyl hydroxyalkyl ethers which are represented by the formula

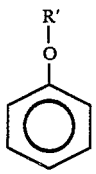

where R' is an hydroxyalkyl radical of from 1 to 4 carbon atoms and phenylalkanols which are represented by the formula

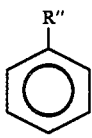

where R" is an alkanol radical of from 1 to 6 carbon atoms; and admixtures thereof.

Preferable activators are those selected from the group consisting of phenyl 2-hydroxypropyl ether, phenyl 2-hydroxyethyl ether, benzyl alcohol and phenethyl alcohol.

Mixing of the activators can be done in any suitable process which produces agitation. Mixing should be continued until a significant increase in viscosity is observed. The increase in viscosity is generally on the order of about 30 to about 260%. The activators of this invention are generally added in an amount of from about 0.5 to about 30 weight percent of the organophilic clay suspension medium. Preferably the activators are present in the quantity of from about 4 to 7 weight percent.

Optionally to increase the suspending capacity of the organophilic clay suspension medium water may be added as a co-activator with the activator as above described. The water may be admixed with the suspension medium by any means which produces sufficient agitation to homogenize the mixture. The water is generally present in an amount in the range of from about 0.125 to 16 weight percent of the suspension medium.

The liquid suspension medium formed by this invention may be used in the formation of a variety of liquid hydrocarbon based systems such as drilling fluids, paints and greases.

The particulate solids to be suspended should be particles capable of passing through mesh in the range of from 20 to 325 meshes per inch. The particles may consist of any synthetic or natural particulate solids normally used in drilling fluids, paints or greases which are not soluble in the liquid hydrocarbon used as the carrier. Examples of suitable solids are synthetic or natural dry water soluble polymer, pigments and sulfonated asphalts. Representative examples of such polymers are those selected from the group consisting of polyacrylamides, carboxymethyl celluloses, hydroxyethyl cellulose sodium polyacrylate, starches, natural gums, synthetic polymers and the like as well as admixtures thereof.

The amount of particulate solids which may be present in this invention may consists of particulate solids in the broad range of from about 0.1 to about 50 weight percent of the combined weight of particulate solids and the medium.

The various constituents of the suspending medium of the present invention are present within the following ranges.

| Component[1] | Broad Range | Preferred Range |
| --- | --- | --- |
| Organophilic Clay | .5–8% | 1–5% |
| Liquid hydrocarbon | 99–70% | 70%–90% |
| Phenyl hydroxyalkyl ethers or Phenylalkanol | .5–30% | 4–7% |

[1]This table is based on 100 weight percent of total suspension medium

The following specific examples are intended to further illustrate the invention.

EXAMPLE I

Two organophilic clay suspensions were prepared. Solution series A comrpised an isoparaffinic oil of from $C_{10}$ to $C_{13}$ carbons with a flash point of 125° F. and a commercial grade of bentonite derived organophilic clay. Solution Series B comprised the same isoparaffinic oil used in Solution A and a commercial grade of hectorite derived organophilic clay. Each solution of Series A and B consisted of 100 grams of isoparaffinic oil and 10 grams of clay.

The clay and oil were mixed using a Scovill Hamilton Beach blender at approximately 3000 rpm (lowest operable speed) until the mixture was homogeneous.

Presented below in Table I are data characteric of the activation achieved by the use of the present invention in comparison to similar compounds.

The activators of Table I were then singlely admixed with solutions A and B. Mixing was conducted at approximately 3000 rpms for one minute, the viscosities were then determined using a Fann 35 Viscometer using API for determining apparent viscosities. The results are noted in Table I.

TABLE I

| | | Organophilic Clays | | | |
| --- | --- | --- | --- | --- | --- |
| | | Bentonite Viscosities | | Hectorite Viscosities | |
| Activator | Amt g | 600 rpms | AV | 600 rpms | AV |
| Propylene glycol | 1.0 | 6 | 3.0 | 8 | 4.0 |
| Butoxy ethanol | 1.0 | 7 | 3.5 | 16 | 8.0 |
| Propylene glycol mono methyl ether | 1.0 | 5 | 2.5 | 8 | 4.0 |
| Phenyl 2-hydroxy-propyl ether | 1.0 | 10 | 5.0 | 20 | 10.0 |
| Phenyl 2-hydroxy-ethyl ether | 1.0 | 18 | 9.0 | 106 | 53.0 |
| Propylene glycol methyl ethyl | 1.0 | 7 | 3.5 | 15 | 7.5 |
| Benzyl alcohol | 1.0 | 12 | 6.0 | 102 | 51.0 |
| Phenethyl alcohol | 1.0 | 13 | 6.5 | — | — |
| Phenetole | 1.0 | 6 | 3.0 | — | — |
| Base Solution | — | 5 | 2.5 | 7 | 3.5 |

[1]Viscosities were determined using the Fann 35 Viscometer at 600 rpms and the Apparent Viscosities determined by dividing by two.

This above series of runs show that phenyl hydroxyalkyl ethers and phenylalkanols are effective activators. The data also demonstrates that phenyl hydroxyalkyl ethers and phenylalkanols are capable of activating organophilic clays in low shear mixing.

EXAMPLE II

To each of the series of samples prepared as in Example I, 20 mls of water was admixed therewith for one minute at approximately 3000 rpms using a Scovill Hamilton Beach blender. The results are set forth in Table II.

TABLE II

| | Organophilic Clays Derived From | | | |
|---|---|---|---|---|
| | Bentonite Viscosities[1] | | Hectorite Viscosities | |
| Activator[2] | 600 rpms | AV | 600 rpms | AV |
| Propylene glycol | 10 | 5.0 | 20 | 10.0 |
| Butoxy ethanol | 11 | 5.5 | 46 | 23.0 |
| Propylene glycol mono methyl ether | 9 | 4.5 | 16 | 8.0 |
| Phenyl 2-hydroxypropyl ether | 26 | 13.0 | 81 | 40.5 |
| Phenyl 2-hydroxyethyl ether | 42 | 21.0 | 271 | 135.5 |
| Propylene glycol methyl ether | 11 | 5.5 | 29 | 14.5 |
| Benzyl alcohol | 25 | 12.5 | 225 | 112.5 |
| Phenethyl alcohol | 42 | 21.0 | — | — |
| Phenetole | 10 | 5.0 | — | — |
| Base Solution | 5 | 2.5 | 10 | 5.0 |

[1]Viscosities were determined using the Fann 35 Viscometer at 600 rpms and the Apparent Viscosities determined by dividing by two.
[2]with 20 mls of water added therein Table II demonstrates that after initial activation by phenyl hydroxyalkyl ethers or phenylalkanols water will increase the suspending characteristics of the activated organophilic clay suspension medium substantially. The addition of water to the base solution, however, does not effect the activation of the organophilic clay suspension when added without the benefit of pretreatment with phenyl hydroxyalkyl ether or phenylalkanols.

The amount of water which may be added to increase the viscosity of an organophilic clay suspension medium which has already been treated with phenyl hydroxyalkyl ehters or phenylakanols was determined in Table III.

The organophilic clay, isoparaffinic oil and phenyl 2-hydroxypropyl ether were mixed according to the procedure outlined in Example I.

TABLE III

| | Co-Activator Viscosity Test | | | | | |
|---|---|---|---|---|---|---|
| | Oil[1] | H₂O | Organo-philic Clay[2] | PPH[3] | Viscosity[4] | |
| | | | | | 300 RPM | 600 RPM | % H₂O |
| 1 | 142.5 | | 7.5 | 7.5 | 30 | 36 | 0 |
| 2 | 142.312 | .188 | 7.5 | 7.5 | 73 | 82 | .125 |
| 3 | 142.125 | .375 | 7.5 | 7.5 | 88 | 98 | .250 |
| 4 | 141.75 | .750 | 7.5 | 7.5 | 91 | 101 | .500 |
| 5 | 141.00 | 1.50 | 7.5 | 7.5 | 95 | 105 | 1.00 |
| 6 | 139.50 | 3.00 | 7.5 | 7.5 | 96 | 107 | 2.00 |
| 7 | 136.50 | 6.00 | 7.5 | 7.5 | 108 | 119 | 4.00 |
| 8 | 130.5 | 12.00 | 7.5 | 7.5 | 115 | 127 | 8.00 |
| 9 | 118.5 | 24.00 | 7.5 | 7.5 | 145 | 162 | 16.00 |
| 10 | 94.5 | 48.00 | 7.5 | 7.5 | * | — | 32.00 |
| 11 | 46.5 | 96.00 | 7.5 | 7.5 | * | — | 64.00 |

*would not blend together
[1]isoparaffinic oil of C₉ to C₁₄ with a flash point of 127° F.
[2]derived from bentonitic clay
[3]phenyl 2-hydroxypropyl ether
[4]viscosities were determined using the Fann 35 Viscometer at 600 and 300 rpms.

Table III shows that the amount of water which may be added for increased suspension characteristics varies from about 0.125 weight percent to about 16 weight percent.

The examples have been provided merely to illustrate the practice of my inveniton and should not be read so as to limit the scope of my invention or the appended claims in any way. Reasonable variations and modifications not departing from the essence and spirit of my invention, are contemplated to be within the scope of the patent protection desired and sought.

That which is claimed is:

1. An improved liquid suspension medium for particulate solids said suspension medium having been formed by admixing
    (a) an organophilic clay wherein the clay is selected from the group consisting of bentonite, attapulgite, sepiolite and hectorite and admixtures thereof present in the quantity of about 0.5–8 weight percent with
    (b) a liquid hydrocarbon present in the quantity of about 99–70 weight percent and
    (c) at least one activator selected from the group consisting of phenyl hydroxyalkyl ethers which are represented by the formula

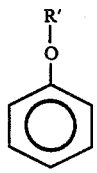

where R' is a hydroxyalkyl of from 1 to 4 carbon atoms and phenylalkanols which are represented by the formula

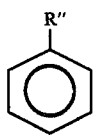

where R" is an alkanol of from 1 to 6 carbon atoms and admixtures thereof present in the quantity of about 4–7 weight percent.

2. The suspension medium of claim 1 wherein said liquid hydrocarbon is selected from the group consisting of crude oil kerosene, naphthas, heavy naphthas, straight run gasoline diesel fuel, jet fuel, benzene, xylene, toluene and isoparaffinic oil.

3. The suspension medium of claim 1 wherein the phenyl ether and phenylalkanols are selected from the group consisting of phenyl 2-hydroxypropyl ether, phenyl 2-hydroxyethyl ether, benzyl alcohol and phenethyl alcohol.

4. The suspension medium of claim 1 wherein said organophilic clay is (a) organophilic bentonite, (b) said liquid hydrocarbon is an isoparaffinic of $C_{10}$ to $C_{14}$ carbon atoms with a flash point of 125° F. and (c) said activator is phenyl 2-hydroxypropyl ether.

5. The suspension medium of claim 1 wherein said organophilic clay is (a) organophilic hectorite, (b) said liquid hydrocarbon is an isoparaffinic of $C_{10}$ to $C_{14}$ carbon atoms with a flash point of 125° F. and (c) said activator is phenyl 2-hydroxypropyl ether.

6. The suspension medium of claim 1 wherein
    (a) said organophilic clay is present in the quantity of from about 1 to 5 weight percent, and
    (b) said liquid hydrocarbon is present in the quantity of from about 90 to 70 weight percent
    (c) said activator is present in the quantity of from about 4 to 7 weight percent.

7. A suspension medium according to claim 1 wherein said activator is employed in combination with water as a coactivator.

8. A suspension medium according to claim 7 wherein said water co-activator is present in quantities from about 0.125 to 16 weight percent.

9. The suspension of claim 1 wherein the activator is phenyl 2-hydroxypropyl ether.

10. The suspension of claim 1 wherein the activator is phenyl 2-hydroxyethyl ether.

11. The suspension of claim 1 wherein the activator is benzyl alcohol.

12. The suspension of claim 1 wherein the activator is phenethyl alcohol.

* * * * *